US010042172B2

(12) United States Patent
Doucet et al.

(10) Patent No.: US 10,042,172 B2
(45) Date of Patent: Aug. 7, 2018

(54) OPTICAL BEAM CONDITIONING DEVICE WITH COHERENCE-BREAKING AND BEAM TRANSFORMING MODULES

(71) Applicant: INSTITUT NATIONAL D'OPTIQUE, Quebec (CA)

(72) Inventors: Michel Doucet, Quebec (CA); Alain Bergeron, Quebec (CA); Linda Marchese, Quebec (CA)

(73) Assignee: INSTITUT NATIONAL D'OPTIQUE, Quebec, Quebec (CA)

( * ) Notice: Subject to any disclaimer, the term of this patent is extended or adjusted under 35 U.S.C. 154(b) by 40 days.

(21) Appl. No.: 15/390,081

(22) Filed: Dec. 23, 2016

(65) Prior Publication Data
US 2017/0184865 A1   Jun. 29, 2017

Related U.S. Application Data (60) Provisional application No. 62/387,577, filed on Dec. 23, 2015.

(51) Int. Cl.
*G02B 26/08*   (2006.01)
*G02B 27/09*   (2006.01)
(Continued)

(52) U.S. Cl.
CPC .......... *G02B 27/0927* (2013.01); *G02B 5/09* (2013.01); *G02B 26/0816* (2013.01); *G02B 27/0012* (2013.01); *G02B 27/0983* (2013.01)

(58) Field of Classification Search
CPC .............. G02B 26/0841; G02B 26/105; G02B 26/085; G02B 26/0858; G02B 26/0833;
(Continued)

(56) References Cited

U.S. PATENT DOCUMENTS

| 6,022,114 A | 2/2000 | Foo |
| 8,277,060 B2 | 10/2012 | Cook |
| 2008/0198334 A1* | 8/2008 | Kasazumi ............ G02B 27/48 353/38 |

FOREIGN PATENT DOCUMENTS

EP   2 527 907 A1   11/2012

OTHER PUBLICATIONS

Malyak, Phillip H.; "Two-mirror unobscured optical system for reshaping the irradiance distribution of a laser beam"; Applied Optics; 1992; pp. 4377-4383; vol. 31; No. 22.

(Continued)

*Primary Examiner* — Jennifer D. Carruth
(74) *Attorney, Agent, or Firm* — Merchant & Gould P.C.

(57) ABSTRACT

A beam conditioning device includes a coherence-breaking module and a beam transforming module. The coherence-breaking module is configured to break a spatial coherence between beam components of the light beam and may include coherence-breaking mirrors having a structured pattern on their reflective surfaces. The beam transforming module may include a primary optical element and a secondary optical element and is configured to transform the spatial energy distribution and the footprint of the light beam. The beam conditioning device may be used to transform a Gaussian light beam into a flat-top light beam suitable for terahertz imaging applications, although other initial and/or final energy distributions may be considered.

20 Claims, 8 Drawing Sheets (51) Int. Cl.
*G02B 5/09* (2006.01)
*G02B 27/00* (2006.01)

(58) Field of Classification Search
CPC ... G02B 26/101; B81B 3/0083; B81B 3/0086;
B81B 2203/04
USPC ......... 359/198.1–199.4, 200.6–200.8, 202.1,
359/221.2, 223.1–225.1, 226.2, 904,
359/290–295, 838, 846, 871, 872;
250/204, 559.06, 559.29, 230, 234;
347/255–260; 353/39, 98–99;
385/15–18, 22; 398/12, 19, 45
See application file for complete search history.

(56) References Cited

OTHER PUBLICATIONS

Shealy, David L.; "Theory of Geometrical Methods for Design of Laser Beam Shaping Systems"; Proceedings of SPIE; 2000; pp. 1-15; vol. 4095.

Hsiao, Yung-Neng, Wu, Hau-Ping, Chen, Cheng-Huan, Lin, Yu-Chung, Lee, Min-Kai and Liu, Sung-Ho; "One-Dimensional Reflective Diffuser for Line Beam Shaper with Microlens Array Homogenizer"; Optical Review; 2014; pp. 715-718; vol. 21.

Shirley, Lyle G. and George, Nicholas; "Speckle from a cascade of two thin diffusers"; Journal of the Optical Society of America; 1989; pp. 765-781; vol. 6; No. 6.

SÜSS MicroOptics SA, "Tech Brief—Diffuser", Copyright 2009, Switzerland, http://www.suss.ch/media/downloads/SUSS%20MicroOptics%20Diffuser%20Tech%20Brief.pdf.

\* cited by examiner

OPTICAL BEAM CONDITIONING DEVICE WITH COHERENCE-BREAKING AND BEAM TRANSFORMING MODULES

TECHNICAL FIELD

The technical field generally relates to geometrical optics and more particularly concerns optical devices and modules for conditioning a light beam for use in applications such as imaging and the like.

BACKGROUND

The light beams generated by laser systems generally have a shape and spatial intensity distribution dictated by intrinsic characteristics related to the light-generating process and geometry of the laser. Typically, the raw light beam emitted from a laser has an elliptical shape or footprint in a plane transverse to its propagation axis, with a Gaussian irradiance distribution that peaks at its center and gradually fades towards the outer edges. For many applications, however, there is a need for converting a Gaussian beam into a flat-top beam, or more generally, into a beam with a different energy distribution and/or shape.

For example, in imaging applications a uniform light beam is preferred to produce good quality images while minimizing the fixed pattern noise caused by background information. Furthermore, when the energy of the light source is limited there is a need to concentrate as much energy as possible in a given area.

In another example, in laser material processing, there is a need for concentrating all the energy carried by an optical beam into a given shape such as a square, a circle or other given shapes. In this case there is a need for very weak absorption of the energy, hence the choice of a design based on reflective optics to limit the energy absorbed by the optics and maximize the energy that can be used to perform material processing.

There remains a need in the field for a device that allows a transformation of the spatial intensity distribution of a light beam while providing at least some of the beam characteristics mentioned above.

SUMMARY

The present description generally concerns a beam conditioning device, which includes a coherence-breaking module and a beam transforming module. The beam conditioning device may for example be used to transform a Gaussian light beam into a flat-top light beam, although other initial and/or final energy distributions may be considered.

In accordance with one aspect, there is provided a beam conditioning device for conditioning a light beam having a shape in a transverse plane perpendicular to a propagation axis of said light beam defining a non-uniform initial spatial energy distribution.

The beam conditioning device includes a coherence-breaking module for breaking a spatial coherence between beam components of the light beam. The coherence-breaking module includes a first and a second coherence-breaking mirror successively disposed in an optical path of the light beam and each having a reflective surface extending along a reflection plane intersecting the propagation axis of the light beam. The reflecting surface of each coherence-breaking mirror has a structured pattern, the structured pattern including a plurality of sloped elements distributed over the reflection plane, each sloped element being configured to deviate any of the beam components of the light beam incident thereon by a small angle.

The beam conditioning device further includes a beam transforming module comprising a primary and a secondary optical element successively disposed in an optical path of the light beam. The primary and secondary optical elements are disposed relative to each other such that the propagation axis of the light beam downstream the secondary optical element is parallel to the propagation axis thereof upstream the primary optical element, the secondary optical element being positioned off-axis with respect to at least one axis transverse to the propagation axis of the light beam. Each of the primary and secondary optical elements has a surface topography respectively redirecting beam components of the light beam along first and second redirected trajectories, the surface topographies of the primary and secondary optical elements being configured such that the second redirected trajectories collectively define a final spatial energy distribution having a uniform portion.

In some implementations, each sloped element is oriented to deviate the beam component of the light beam incident thereon at a deviation angle slightly different than a deviation angle imparted on neighboring beam components by neighboring sloped elements.

In some implementations, each sloped element includes a protuberance projecting from the reflection plane of the corresponding coherence-breaking mirror. In other implementations, each sloped element includes a depression into the reflecting surface of the corresponding coherence-breaking mirror.

In some implementations, each coherence-breaking mirror is rotatable about a rotation axis perpendicular to the corresponding reflection plane. The coherence-breaking module may further include, in association with each coherence breaking mirror, a rotating mount supporting the corresponding coherence-breaking mirror, and a motor connected to the rotating mount to impart a rotation thereon.

In some implementations, the beam conditioning device may be configured for use in an imaging system characterised by an exposition time frame, the coherence-breaking module being configured to rotate each coherence-breaking mirror at a rotation speed sufficient to break a temporal coherence between the beam components of the light beam over the exposition time fame of the imaging system.

In some implementations, the first and second coherence-breaking mirrors are relatively disposed with their respective reflection planes at a right angle.

In some implementations, each of the first and second coherence-breaking mirrors is disposed such that the corresponding reflection plane makes a 45° angle with respect to the propagation axis of the light beam incident thereon.

In some implementations, the primary optical element is a convex mirror and the secondary optical element is a concave mirror. The convex mirror may have a local curvature which is maximum at a point intercepting a central ray of the initial spatial energy distribution of the light beam and decreases in conjunction with said initial spatial energy distribution.

In some implementations, the secondary optical element is positioned off-axis with respect to two orthogonal axes transverse to the propagation axis of the light beam.

In some implementations, the surface topographies of the primary and secondary optical elements correspond to solutions to a set of equations representing the first and second redirected trajectories as functions of said surface topographies and of derivatives of said surface topographies in view of the initial spatial energy distribution and the final spatial energy distribution. These solutions may be numerically obtained or analytically obtained.

In some implementations, the initial spatial energy distribution has a Gaussian shape. The final spatial energy distribution may be a flat top shape defined by said uniform portion flanked by gradually decreasing side walls.

In some implementations, the shape of the light beam defines an initial footprint, and the beam transforming module is further configured to transform the shape of the light beam into a final footprint different from the initial footprint. The initial footprint may have an elliptical shape and the final footprint may have a rectangular shape.

In accordance with another aspect, there is provided a coherence-breaking module for breaking a spatial coherence between beam components of a light beam having an optical frequency in the terahertz frequency range or lower. The coherence-breaking module includes a first and a second coherence-breaking mirror successively disposed in an optical path of the light beam and each having a reflective surface extending along a reflection plane intersecting a propagation axis of the light beam. The reflecting surface of each coherence-breaking mirror includes a structured pattern, the structured pattern including a plurality of sloped elements distributed over the reflection plane. Each sloped element is configured to deviate any of the beam components of the light beam incident thereon by a small angle.

In some implementations, each sloped element is oriented to deviate the beam component of the light beam incident thereon at a deviation angle slightly different than a deviation angle imparted on neighboring beam components by neighboring sloped elements.

In some implementations, each sloped element includes a protuberance projecting from the reflection plane of the corresponding coherence-breaking mirror.

In some implementations, each sloped element includes a depression into the reflecting surface of the corresponding coherence-breaking mirror.

In some implementations, each coherence-breaking mirror is rotatable about a rotation axis perpendicular to the corresponding reflection plane. The coherence-breaking module may further includes, in association with each coherence breaking mirror a rotating mount supporting the corresponding coherence-breaking mirror, and a motor connected to the rotating mount to impart a rotation thereon.

In some implementations, the coherence-breaking module may be configured for use in an imaging system characterised by an exposition time frame, the coherence-breaking module being configured to rotate each coherence-breaking mirror at a rotation speed sufficient to break a temporal coherence between the beam components of the light beam over the exposition time fame of the imaging system.

In some implementations, the first and second coherence-breaking mirrors are relatively disposed with their respective reflection planes at a right angle.

In some implementations, each of the first and second coherence-breaking mirrors is disposed such that the corresponding reflection plane makes a 45° angle with respect to the propagation axis of the light beam incident thereon.

In accordance with another aspect, there is provided a beam transforming module for use in imaging applications involving a light beam having a shape in a transverse plane perpendicular to a propagation axis of said light beam defining a non-uniform initial spatial energy distribution and an initial footprint. The beam transforming module includes:

a primary optical element disposed in an optical path of the light beam and having a surface topography redirecting beam components of the light beam along corresponding first redirected trajectories; and a secondary optical element disposed downstream the primary optical element and positioned off-axis with respect to two orthogonal axes transverse to the propagation axis of the light beam, the secondary optical element having a surface topography redirecting the beam components of the light beam along corresponding second redirected trajectories.

The surface topographies of the primary and secondary optical elements are configured such that the second redirected trajectories collectively define a final spatial energy distribution having a uniform portion and a final footprint different from the initial footprint.

In some implementations, the primary optical element is a convex mirror and the secondary optical element is a concave mirror. The convex mirror may have a local curvature which is maximum at a point intercepting a central ray of the initial spatial energy distribution of the light beam and decreases in conjunction with said initial spatial energy distribution.

In some implementations, the primary and secondary optical elements are disposed relative to each other such that the propagation axis of the light beam downstream the secondary optical element is parallel to the propagation axis thereof upstream the primary optical element.

In some implementations, the surface topographies of the primary and secondary optical elements may correspond to solutions to a set of equations representing the first and second redirected trajectories as functions of said surface topographies and of derivatives of said surface topographies in view of the initial spatial energy distribution and the final spatial energy distribution. These solutions may be numerically obtained or analytically obtained.

In some implementations, the initial spatial energy distribution has a Gaussian shape. The final spatial energy distribution may have a flat top shape defined by said uniform portion flanked by gradually decreasing side walls. The initial footprint may have an elliptical shape and the final footprint may have a rectangular shape.

In accordance with yet another aspect there may also be provided a beam transforming module for use in imaging applications involving a light beam having an optical frequency in the terahertz frequency range or lower. The light beam has a shape in a transverse plane perpendicular to a propagation axis of said light beam defining a non-uniform initial spatial energy distribution.

The beam transforming module includes a primary optical element disposed in an optical path of the light beam, the primary optical element having a surface topography redirecting beam components of the light beam along corresponding first redirected trajectories. The beam transforming module further includes a secondary optical element disposed downstream the primary optical element, the secondary optical element having a surface topography redirecting the beam components of the light beam along corresponding second redirected trajectories.

The surface topographies of the primary and secondary optical elements correspond to numerically obtained solutions to a set of equations representing the first and second redirected trajectories as functions of said surface topographies and of derivatives of said surface topographies in view of the initial spatial energy distribution and further in view of a final spatial energy distribution having a flat top shape defined by a uniform portion flanked by gradually decreasing side walls.

In some implementations the initial spatial energy distribution has a Gaussian shape and the surface topographies of the primary and secondary optical elements are further configured to transform a footprint of the light beam from an elliptical shape to a rectangular shape.

In accordance with yet another aspect there is also provided a light generating assembly for use in imaging applications. The light generating assembly includes a coherent light source operable to generate a light beam having an optical frequency in the terahertz frequency range or lower, the light beam further having a shape in a transverse plane perpendicular to a propagation axis of said light beam defining a non-uniform initial spatial energy distribution and an initial footprint.

The light generating assembly includes a coherence-breaking module disposed in an optical path of the light beam and configured to break a spatial coherence between beam components of the light beam, and a beam transforming module disposed in the optical path of the light beam and configured to transform the shape of the light beam into a final spatial energy distribution having a uniform portion and a final footprint different from the initial footprint.

In some implementations, the coherence-breaking module includes at least one coherence-breaking mirror having a reflective surface extending along a reflection plane intersecting the propagation axis of the light beam. The reflecting surface of each coherence-breaking mirror may include a structured pattern, the structured pattern including a plurality of sloped elements distributed over the reflection plane. Each sloped element may be configured to deviate any of the beam components of the light beam incident thereon by a small angle. Each sloped element may be oriented to deviate the beam component of the light beam incident thereon at a deviation angle slightly different than a deviation angle imparted on neighboring beam components by neighboring sloped elements.

In some implementations, each sloped element includes a protuberance projecting from the reflection plane of the corresponding coherence-breaking mirror. Alternatively, each sloped element may include a depression into the reflecting surface of the corresponding coherence-breaking mirror.

In some implementations, each coherence-breaking mirror is rotatable about a rotation axis perpendicular to the corresponding reflection plane. The light generating assembly may further include, in association with each coherence breaking mirror, a rotating mount supporting the corresponding coherence-breaking mirror, and a motor connected to the rotating mount to impart a rotation thereon.

In some implementations, the light generating assembly is configured for use in an imaging system characterised by an exposition time frame, the coherence-breaking module being configured to rotate each coherence-breaking mirror at a rotation speed sufficient to break a temporal coherence between the beam components of the light beam over the exposition time fame of the imaging system.

In some implementations, the at least one coherence-breaking mirror may consist of two of said coherence-breaking mirrors successively disposed in the optical path of the light beam. The first and second coherence-breaking mirrors may be relatively disposed with their respective reflection planes at a right angle. The first and second coherence-breaking mirrors may be disposed such that the corresponding reflection plane makes a 45° angle with respect to the propagation axis of the light beam incident thereon.

In some implementations, the beam transforming module includes a primary and a secondary optical element successively disposed in the optical path of the light beam. The primary optical element may have a surface topography redirecting the beam components of the light beam along corresponding first redirected trajectories and the secondary optical element may have a surface topography redirecting the beam components of the light beam along corresponding second redirected trajectories. The surface topographies of the primary and secondary optical elements are configured such that the second redirected trajectories collectively define the final spatial energy distribution of the light beam when said light beam impinges on the primary optical element in the initial spatial energy distribution.

In some implementations, the primary optical element is positioned off-axis with respect to at least one axis transverse to the propagation axis of the light beam.

In some implementations, the primary optical element is a convex mirror and the secondary optical element is a concave mirror. The convex mirror may have a local curvature which is maximum at a point intercepting a central ray of the initial spatial energy distribution of the light beam and decreases in conjunction with said initial spatial energy distribution.

In some implementations, the primary and secondary optical elements are disposed relative to each other such that the propagation axis of the light beam downstream the secondary optical elements is parallel to the propagation axis thereof upstream the primary optical element.

In some implementations, the surface topographies of the primary and secondary optical elements correspond to solutions to a set of equations representing the first and second redirected trajectories as functions of said surface topographies and of derivatives of said surface topographies in view of the initial spatial energy distribution and the final spatial energy distribution. These solutions may be numerically or analytically obtained.

In some implementations, the initial spatial energy distribution may have a Gaussian shape. The final spatial energy distribution may have a flat top shape defined by said uniform portion flanked by gradually decreasing side walls. The initial footprint may have an elliptical shape and the final footprint may have a rectangular shape.

Other features and advantages of the invention will be better understood upon reading of preferred embodiments thereof with reference to the appended drawings.

DETAILED DESCRIPTION

Figure 1:
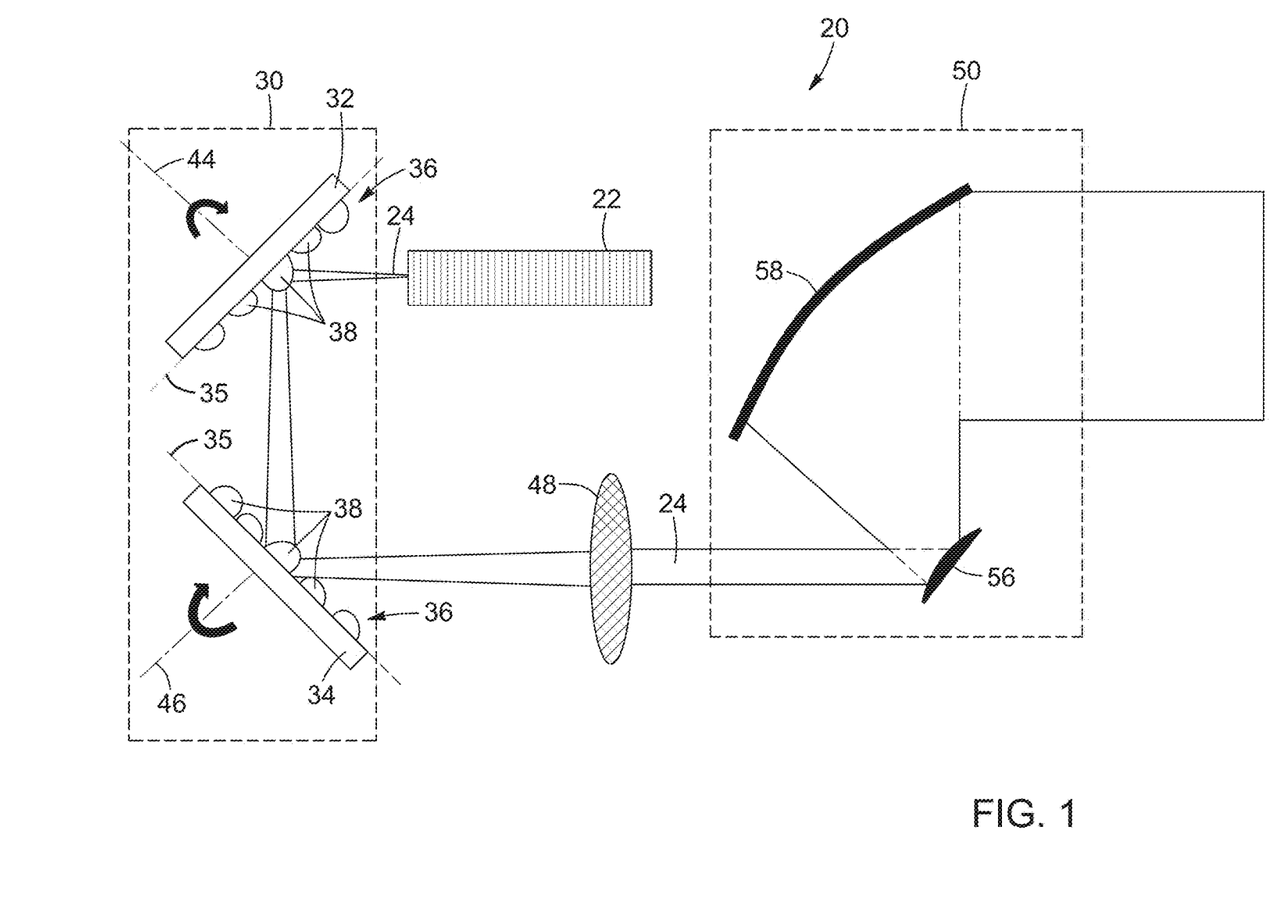
FIG. 1 is a schematized representation of a beam conditioning device according to one embodiment.

Referring to FIG. 1, there is shown a beam conditioning device 20 in accordance with one implementation.

Embodiments of the beam conditioning device 20 may be useful in the context of various applications where it is desirable to adapt a light beam in view of a target application. The expression "conditioning" is understood herein to refer to such an adaptation, and may include acting on the light beam to modify at least some of its optical properties such as its spatial or temporal coherence, its spatial energy distribution and/or its footprint. For example, such a device may be used for imaging applications or for laser processing applications.

The beam conditioning device 20 may be used in conjunction with a source of coherent electromagnetic radiation, hereinafter referred to as a coherent light source 22, generating a light beam 24. It will be readily understood that in the context of the present description, the reference to a "light beam" is not considered limited to light having a wavelength within the visible spectrum, but is intended to cover electromagnetic radiation within a broad spectral range, for example from the UV to the millimeter wavebands. Some embodiments may be particularly useful for imaging applications using light in the terahertz frequency range or lower, for such as the millimeter wavelength range. In some implementations, the terahertz range may be understood to include optical frequencies corresponding to wavelengths between 700 μm and 1075 μm.

The coherent light source 22 may be embodied by any device apt to generate a coherent light beam. As known to those skilled in the art, a coherent light beam is characterized by the fact that all of its constituting beam components or rays have substantially the same optical frequency (or wavelength) and the same phase. The light beam may be spatially and/or temporally coherent, and is typically both. Spatial coherence refers to the correlation between waves at different points in space, i.e. the correlation between the frequency and phase of different beam components or rays of the light beam. Temporal coherence refers to the correlation between waves observed at different moments in time. In some embodiments, the beam conditioning device may be configured to break the spatial coherence between the beam components of the light beam, and optionally, may be further configured to break the temporal coherence.

In some implementations, the coherent light source 22 may be a laser, emitting monochromatic or narrow bandwidth light at a desired wavelength. Such a laser may for example be a semiconductor laser, quantum cascade laser, gas laser, solid state laser, and the like. Alternatively, the coherent light source 22 may be a GaAs diode, Gunn diode, Schottky diode, Backward Wave Oscillator, etc. It will be readily understood by one skilled in the art that the term "source" is meant to encompass stand-alone devices as well as more complex optical assemblies or systems comprising a plurality of components cooperating together to provide the desired light beam. By way of example, in the context of terahertz imaging the coherent light source may be embodied by a Gunn diode combined with a frequency doubler or a frequency tripler to obtain a shorter wavelength.

The beam conditioning device may be configured to modify the spatial distribution of optical energy within the light beam 24. Preferably, the beam conditioning device may transform the shape of the light beam in a transverse plane perpendicular to its propagation axis from an initial to a final spatial energy distribution. In some embodiments, the initial spatial energy distribution may be non-uniform, whereas the final spatial energy distribution may have a uniform portion. By "uniform spatial energy distribution" it is understood that different components of the light beam have an intensity which is sufficiently similar to be considered the same within the context of a target application. For example, typical laser light sources produce light beams having a spatial energy distribution corresponding to or approximating a Gassian shape, which may define the non-uniform initial energy distribution. One example of an end shape desired for several applications is the so-called "flat-top" shape, wherein the intensity of the light beam 24 is substantially constant transversally to its propagation direction, defining the uniform portion, and has sharp transitions at its edges. In some variants a "flat-top" shape may alternatively have gradually decreasing side walls, as explained further below. It will however be readily understood that the scope of the invention is not limited to the production of flat-top beams. For example, in some implementations it may be sufficient or desirable to produce a light beam having a uniform intensity over only a portion of its transversal area, in which case the remainder of the light beam may have a different intensity. In other implementations, the desired final spatial energy distribution may not be uniform but present desirable characteristics differing from the raw output of the coherent light source. For example, the desired energy profile may present non-uniformities designed to compensate the effect of other optical components in a system on the uniformity of the light beam. In another example, in the context of laser machining it may be advantageous to have an energy distribution favoring the concentration of energy within certain regions of the light beam, for example by providing more energy towards the outer perimeter of the light beam than in its center.

The beam conditioning device may additionally be used to transform the contour or footprint of the light beam. For example, typical laser light sources produce light beams having an elliptical footprint, which may not be optimal for some target applications. Therefore, in some embodiments the beam conditioning device may transform the shape of the light beam from an initial shape, for example elliptical, to a different final footprint. The final footprint may for example have a rectangular shape (which is understood to encompass a square shape as a special case), which may be of particular interest for imaging applications where rectangular shaped detector arrays are used. In other variants, the final footprint may for example be a circle, an ellipse having different proportions than the initial footprint, etc.

As seen in FIG. 1, the beam conditioning device 20 generally includes a coherence-breaking module 30 and a beam transforming module 50. Embodiments of both these modules are described below.

Coherence-Breaking Module

Figure 2:
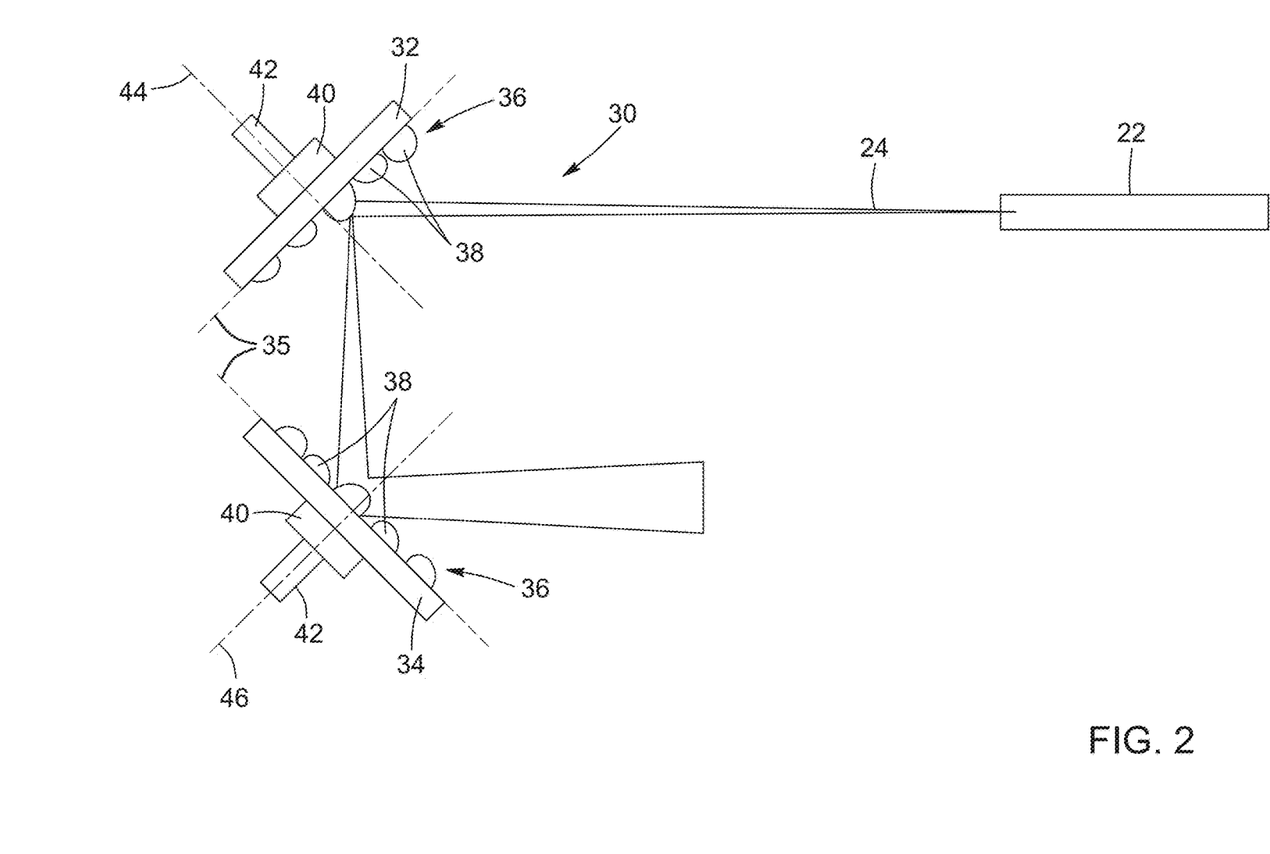
FIG. 2 is a schematized representation of a coherence-breaking module according to one embodiment.

With reference to FIG. 2, a variant of the coherence-breaking module is shown by way of example. As its name entails, the coherence-breaking module 30 is used to break the spatial and/or temporal coherence of the light beam 24, while substantially preserving its divergence as well as other characteristics such as its spectral properties and general shape and energy distribution. It will be readily understood that even though the coherence-breaking module is described herein as a sub-component of a beam conditioning device, in other variants the coherence-breaking module may be used on its own or be part of a different optical system.

In the illustrated implementation of FIGS. 1 and 2, the coherence-breaking module 30 includes first and second coherence-breaking mirrors 32 and 34 successively disposed in an optical path of the light beam and each having a reflective surface extending along a reflection plane 35 intersecting the propagation axis of the light beam. In the illustrated configuration the first coherence-breaking mirror 32 is positioned at a 45° angle with respect to the propagation axis of the light beam 24 impinging thereon. The second coherence-breaking mirror 34 is positioned at a right angle with respect to the first coherence-breaking mirror 32, thereby also nominally forming a 45° angle with light received from the first coherence-breaking mirror 32.

In order to break the spatial coherence of the light beam 24, different beam components of this light beam are preferably delayed with respect to each other, thus creating a variation in their relative phase. By providing local variations in the orientation of the reflecting surface of the first and second coherence-breaking mirrors 32 and 34 with respect to the impinging light beam 24, different beam components of the light beam can be reflected at slightly different reflection angles and/or slightly different times, thus providing the desired phase delays. In accordance with this principle, in one embodiment the reflecting surfaces of both first and second coherence-breaking mirrors 32 and 34 are provided with a structured pattern 36. The structured pattern 36 may for example be composed of a plurality of sloped elements 38 distributed over the reflecting surface of the corresponding coherence-breaking mirror 32 or 34, preferably randomly. Each sloped element 38 deviates the beam component of the light beam incident thereon at a slightly different angle than the deviation imparted on neighboring beam components by neighboring sloped elements 38. Preferably, the slope of each sloped element 38 is computed to deviate the beam component of the light beam incident thereon at small angle, such that the divergence of the light beam at the output of the coherence-breaking module is not significantly greater than its divergence at its input. Various factors can be taken into account in calculating the slope of each sloped element 38, including the wavelength of the light beam 24, the divergence of the light beam required or desired for the targeted application and the acceptance angle of any optical element or system provided downstream the coherence-breaking mirrors 32, 34.

In the embodiment of FIGS. 1 and 2, the sloped elements 38 are shown as protuberances projecting from the reflection plane 35 of the corresponding coherence-breaking mirror 32, 34. The protuberances may for example be provided through an embossing process or through deposition of reflectors. In other variants, the sloped elements 38 can be etched, engraved or otherwise hollowed out of the reflection plane 35 of the corresponding coherence-breaking mirror 32, 34.

Additionally, each of the coherence-breaking mirrors 32, 34 may be mounted on a rotating mount 40, preferably actuated by a motor 42. Each coherence-breaking mirror 32, 34 is therefore rotatable about a corresponding first and second rotation axis 44 and 46 normal to the reflection plane 35 of the corresponding coherence-breaking mirror 32, 34. The rotation of the coherence breaking mirrors 32, 34 serves to change the deviation angle of a given beam component over time, creating an averaging effect which breaks the temporal coherence of the light beam 24. The rotating speed of the coherence-breaking mirrors 32, 34 is preferably selected in order to provide the desired averaging effect on a time scale suitable for the targeted application. For example, for imaging applications the coherence-breaking mirrors should be rotated at a speed sufficient to break the temporal coherence over an integration or exposition time frame of an imaging system used in conjunction with the beam conditioning device 20.

It will be readily understood that in other variants, the coherence-breaking module 30 may have a different configuration than the one illustrated in FIGS. 1 and 2 and described above. For example, a different number of coherence-breaking mirrors may be used, such as a single mirror or more than two. In other implementations, lenses or other transmission elements may be used instead of one or more mirrors. Additionally, the sloped elements may be replaced by other structures creating delays between different beam components. In one example, the textured surface may be replaced by a sloped surface having a constant sloped angle with respect to a plane perpendicular to the corresponding rotation axis.

In one implementation, additional means may be used to further break the coherence of the light beam. For example, a scan of the wavelength of the light beam may provide such an effect. It will also be readily understood that additional optical components such as lenses, mirrors, filters, etc may be provided at various locations within the coherence-breaking module without departing from the scope of the invention.

Beam Transforming Module

Referring back to FIG. 1, and with additional reference to FIGS. 3A and 3B, the beam transforming module 50 according to one implementation will be described in more details.

The beam transforming module 50 is preferably configured to spatially redistribute at least part of the optical energy within the light beam 24 in order to obtain the desired final spatial energy distribution explained above. Such a configuration and design preferably take into account the initial profile of the light beam, i.e. its spatial energy distribution prior to entering the beam transforming module 50. Typically and as mentioned above, light beams generated by laser sources have an initial energy distribution corresponding to or resembling a 2D Gaussian profile. In the example described below, the transformation of a light beam from a Gaussian profile 52 to a flat-top profile 54 will be considered. The beam transforming module can also provide a transformation of the footprint of the light beam 24, such as from an elliptical footprint to a rectangular footprint in the example described below. It should however be understood that other variants may provide a transformation between different initial and/or end shapes and energy profiles without departing from the scope of the invention. By way of example, in another variant the beam transformation module may be designed to transform and initially flat top energy distribution into a final Gaussian energy distribution. In that case, a concave primary mirror and a convex secondary mirror may be used.

The beam transforming module 50 preferably includes a primary optical element 56 and a secondary optical element 58 disposed consecutively in the path of the optical beam and each having a surface topography. The surface topographies of the optical elements 56, 58 can be computed to provide the desired transformation of the light beam. In other words, the surface topographies of the primary and secondary optical elements redirect the beam components of the light beam along corresponding first and second redirected trajectories, and are configured such that the second redirected trajectories collectively define the final spatial energy distribution.

Figure 3A:
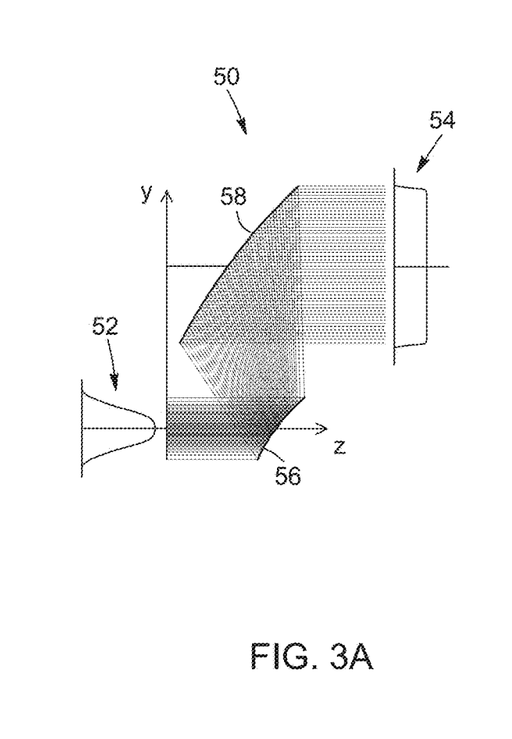
FIGS. 3A, 3B and 3C are two-dimensional and three-dimensional schematized representations of the redirection of light beam components by a beam transforming module according to some embodiments.
Figure 3B:
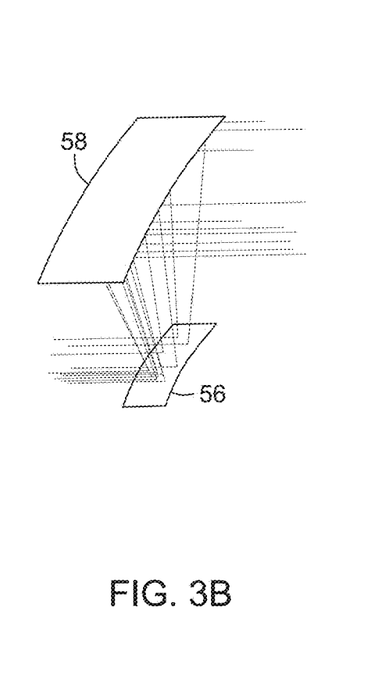
Figure 3C:
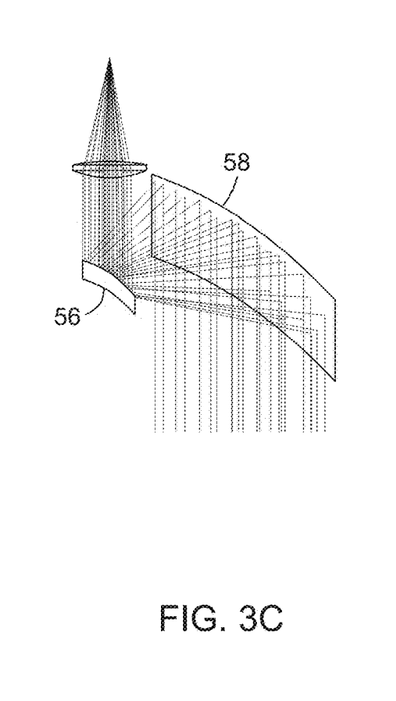

Referring to FIGS. 3A and 3B, the primary and secondary optical elements 56, 58 are preferably disposed relative to each other such that the propagation axis of the light beam downstream the secondary optical element 58 is parallel to the propagation axis thereof upstream the primary optical element 56. The secondary optical element 58 is positioned off-axis with respect to at least one axis transverse to the propagation axis of the light beam. Preferably, this is embodied by positioning the secondary optical element offset vertically (along its long axis in the example of FIG. 3B) from the primary optical to avoid vignetting of the beam, that is, to avoid the primary and secondary elements partially blocking the light beam. In some implementations, such as shown in FIG. 3C, the secondary optical element is positioned off-axis with respect to two orthogonal axes transverse to the propagation axis of the light beam. In the illustrated variant of FIG. 3C this is embodied by positioning the secondary optical element offset vertically as mentioned above, as well as offset horizontally (along its short axis in the illustrated example). While making for a more complex calculation of the related surface topographies, such a configuration advantageously give more space on the side of the primary mirror (for the source, the coherence-breaking module and/or other optical components) and thus allows a more compact arrangement of the beam conditioning system.

In the embodiment of FIGS. 1, 3A, 3B and 3C, the primary and secondary optical elements 56 and 58 are respectively embodied by a convex mirror and a concave mirror. The convex mirror 56 is disposed in the optical path of the light beam 24, which is assumed to be collimated and have a Gaussian initial spatial intensity distribution. It will be noted in FIG. 1 that in this design, a collimating lens 48 is provided in the optical path between the coherence-breaking module 30 and the beam transforming module 50, collimating the light beam 24. The reflection on the convex mirror 56 transforms the collimated light beam 24 into a divergent beam. In addition, the local curvature of the convex mirror 56 is designed to control the intensity distribution of the light beam. In the present embodiment, the curvature of the convex mirror 56 is maximum at the point that intercepts the central ray of the incident Gaussian light beam 24. From this point, the local curvature of the convex mirror decreases in conjunction with the local intensity of the Gaussian light beam, therefore uniformizing its energy distribution.

The concave mirror 58 reflects the divergent light beam 24 received from the convex mirror 56 so that, as a result, the light beam 24 as outputted by the beam transforming module 50 is collimated and has a propagation axis parallel to its propagation axis at the input of the beam transforming module 50.

The surface topographies of both optical elements 56 and 58 that is, the curvature profiles of the convex and concave mirrors, can be computed for a given set of initial and final spatial energy distributions within the light beam, taking into consideration the geometrical characteristics of the system. An example of an approach that may be used for such calculations is provided below. This approach is based on Generic Ray Tracing, or GRT. In the GRT approach, the trajectories of the rays into an optical system are expressed in term of implicit functions that describe the optical surfaces and their derivatives. The approach thus leads to differential equations that are solved numerically or analytically.

Referring to FIGS. 3A and 3B, the redirection of rays (or light beam components) of a light beam transformed through reflections on the convex and concave mirrors 56 and 58 such as explained above is shown. In the illustrated example, the input light beam has a Gaussian profile and an elliptic footprint while the output light beam has a flat-top profile and a rectangular footprint (The principal axes of the rectangular footprint are parallel to their counterparts of the elliptic footprint of the input light beam). The propagation axes of the input and output light beams are parallel. The propagation axis of the input light beam is here denoted as z, and the elliptical footprint of the input light beam implies that the input light beam has two different Gaussian profiles along the orthogonal transverse axes x and y, respectively and arbitrarily associated with the major and minor axes of the ellipse.

The trajectory of any ray can be expressed from the derivatives of the generic description of the surface topography of the convex mirror. The final position of any ray in the output plane can be obtained from energy conservation considerations, and from the fact that both input and output rays are all parallel. Since the input Gaussian beam is constrained to be elliptic with its principal axis parallel with the output beam counterpart, the variables are separable. Hence, the X position of the output rays is ruled by a function of the variable X alone, idem for the Y position. The set of equations is regularized with the constraint of equal path length for all the rays. The general solution for the 3D case is thus obtained by combining two 2D solutions, one in X (depending only on the X variable) with another one in Y. FIG. 3A illustrates the redirection of the rays in one plane, whereas FIG. 3B is a three-dimensional representation of the same.

Figure 4:
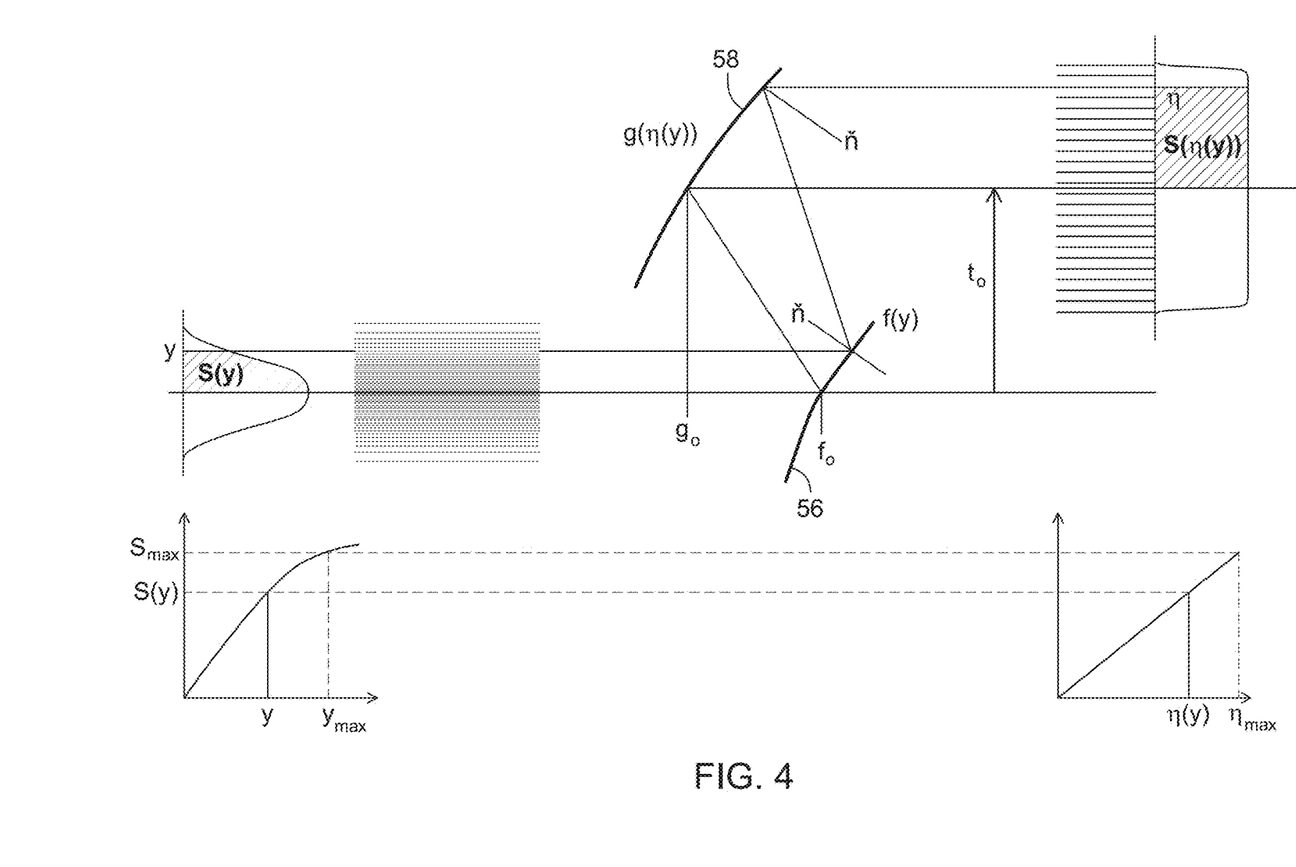
FIG. 4 illustrates the parameters used to calculate the surface topographies of the primary and secondary optical elements of the beam transforming module in one example.

The general three-dimensional problem may be reduced to a pair of two-dimensional problems. FIG. 4 illustrates such a two-dimensional problem with the corresponding parameters involved in the GRT set of equations. The secondary mirror is considered offset vertically from the primary mirror to avoid vignetting of the beam. It can be shown that in the illustrated example, the GRT approach leads to the following set of equations:

$$f(y) = A + B_y \{y[t_o + C_y \text{erf}(\sqrt{2}y/\sigma)] + D_y \exp(-2y^2/\sigma^2) - \frac{1}{2}y^2\}$$

$$g(y) = f(y) - K\{1 - [f'(y)]^2\}$$

$$\eta(y) = t_o + C_y \text{erf}(\sqrt{2}y/\sigma)$$

$$f'(y) = B_y \{t_o + C_y \text{erf}(\sqrt{2}y/\sigma) - y\}$$

Parameters represented on FIG. 4 and appearing on the above equations are defined as:

y is the vertical position of the considered ray of the input Gaussian beam. The origin y=0 is at the centre of the beam (maximum intensity);

S(y) is the integrated energy of the Gaussian energy distribution. The integral is done from the centre of the beam up to the y coordinate;

$f_o$ is the z coordinate where the centre of the Gaussian beam (maximum intensity) intercepts the surface of the convex mirror. The z axis is parallel to the propagation axes of the input and output beams and is also coincident with the central ray of the Gaussian beam;

f(y) is the sag (z coordinate) of the surface of the convex mirror;

η(y) is the vertical position of the output ray corresponding to the vertical position y of the considered input ray;

$g(\eta)$ is the z coordinate of the surface of the concave mirror at the vertical position $\eta$. The set of points $\{(\eta, g(\eta)) | t_o - \eta_{max} < \eta < t_o + \eta_{max}\}$ defines the surface of the concave mirror;

$t_o$ is the vertical position of the output ray derived from the centre ray of the input Gaussian beam;

$g_o$ is the z coordinate of the centre of the concave mirror. It corresponds to the position where the centre ray hits the concave mirror after its reflection on the convex mirror;

$S(\eta)$ is the integrated energy of the output beam. The integration is done from its centre ($t_o$) up to the vertical position $\eta$;

$\check{n}$ is a unit vector along the normal to the surface of either mirror;

A, $B_y$, $C_y$, $D_y$, and K are constants;

erf is the error function, erf(y)=2/sqrt(pi)*integral from 0 to y of exp($-t^2$) dt;

$\sigma$ is the half-diameter of the input Gaussian beam at its waist (y coordinate where the intensity is $1/e^2$ of the maximum intensity value);

exp is the exponential function;

f'(y) is the first derivative with respect to the variable y of the function z=f(y) corresponding to the sag of the convex mirror; and g(y) is the z coordinate of the point on the concave mirror where the input ray propagating at vertical position y hits the concave mirror.

One skilled in the art will readily understand that a 3D solution can be obtained through the mathematical description above by adding a solution along the X axis (depending only on the X variable) to a solution along the Y axis (depending only on the Y variable), both having the shape described above. Only the values of certain parameters used to determine the solution along one axis differ from the equivalent parameters along the other axis.

An analytic solution exists for the case of the transformation of a Gaussian beam into a uniform beam having a rectangular footprint. It will however be understood that for output beams having more complex energy distributions, the solution can be obtained through numerical solutions of the set of differential equations. Combinations of analytical and numerical solutions are also possible. An example of the latter is the extension of a flat top beam with smooth transitions down to negligible intensity all around the uniform portion, i.e. gradually decreasing side walls. In this particular case, the portions of the mirrors generating the uniform illumination are obtained through the analytic solution as explained above, while the extensions of those mirrors which are responsible for the intensity transition can be computed using numerical methods.

As will be readily understood by one skilled in the art, in other implementations other design approaches may be used to determine the surface topographies of the primary and secondary optical elements. By way of example, in some cases a 3D solution can be obtained through "implicit modeling", that is, an optimisation process aiming to minimize the value of a merit function. The merit function may be an implicit model of the desired result. In such a case, the merit function should be constructed such that it imposes constraints on the trajectory and the end point of each beam component of a sample of beam components entering the system. The surface topographies of the primary and secondary optical elements are defined as parametric functions (polynomial) and the optimisation is performed on the surface defining parameters and their relative positions.

It will be readily understood that other configurations could be considered for the beam transforming module without departing from the scope of the invention. For example, one or both of the primary and secondary optical elements could be optically-transmissive elements, such as lenses. Such a variant may be useful particularly in applications where the light beam is of lower power, as a high power beam may damage optically-transmissive elements. Furthermore, additional optical components such as lenses, mirrors, filters, etc. may be provided at various locations within the beam transforming module without departing from the scope of the invention. Another example of a variant of the two-mirror configuration is one where the primary mirror is concave. In that specific case, the beam is converging toward a waist in between the two mirrors and is divergent on the secondary mirror. It is also understood that the design of the beam transforming module is done considering collimated input beam but is significantly maintain is main features for non-perfectly collimated input beam.

Alternative Configurations and Examples

As mentioned above, the beam conditioning device 20 shown in FIG. 1 is only one example of a configuration embodying such a device. Further non-exhaustive examples are shown in FIGS. 5 to 7.

Figure 5:
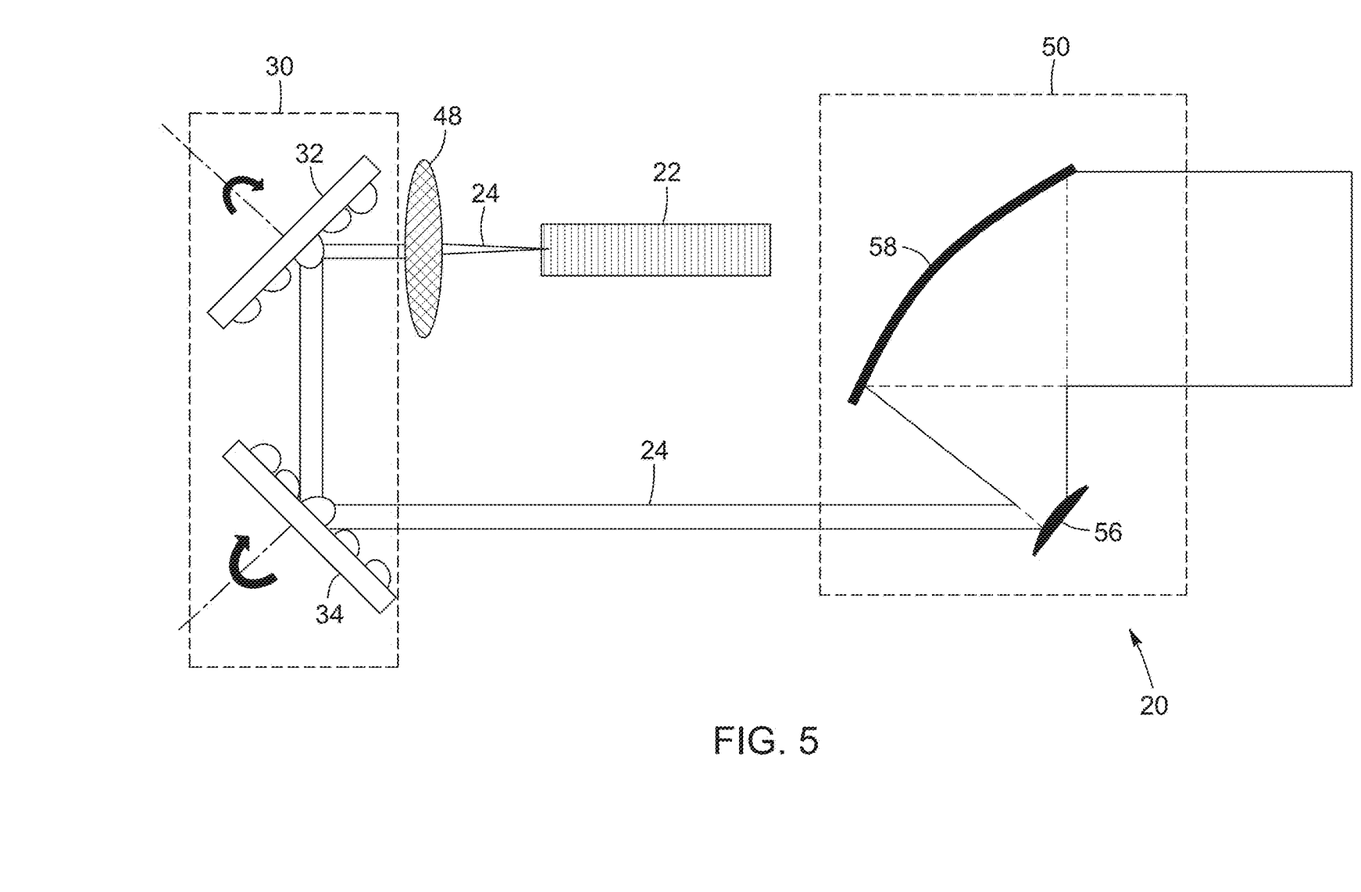
FIGS. 5 to 7 are schematized representations of beam conditioning devices according to other embodiments.

In the variant of FIG. 5, the collimating lens 48 is disposed prior to the coherence-breaking module 30. The light beam 24 reflected by the coherence-breaking mirrors 32 and 34 is therefore collimated or has low divergence. A single collimating mirror may be used in this configuration.

Figure 6:
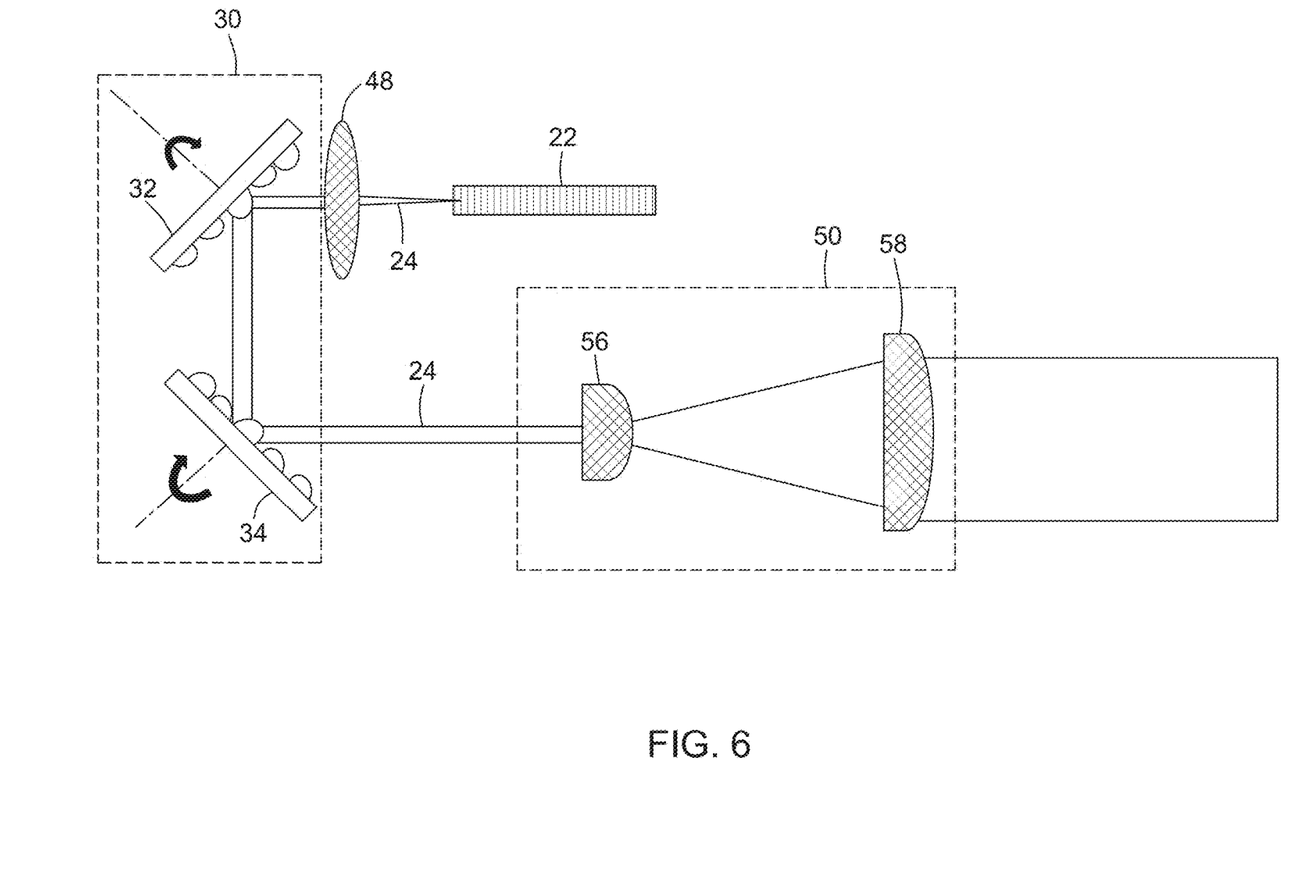

FIG. 6 shows an alternative configuration where the primary and secondary optical elements 56 and 58 of the beam transforming module 50 are used in transmission. In the illustrated implementation both primary and secondary optical elements are cylindrical-like lenses (profiled along one transverse axis) with a specific curvature to redirect the individual rays or beam components of the light beam 24 and to redistribute the energy of the light beam in a uniform manner, such as explained above. For example the primary and secondary optical elements may be a pair of bi-cylindrical lens, i.e. each lens having one surface which is a combination of a cylindrical power in X with a power in Y. the primary and secondary optical elements may also be a pair of lenses each having a cylindrical surface on each of its surfaces with perpendicular orientations. It could also be two pair of cylindrical lenses, on pair with cylindrical power in X direction only and the other pair with cylindrical power in the Y direction only. In another variant, the primary and secondary optical elements may be a combination of a pair of cylindrical lenses with a pair of spherical lenses. Other combinations are also possible (on cylindrical surface combined with a spherical surface for each of the lenses in the pair). One advantage of this type of configuration is that the relative alignment of the primary and secondary optical elements 56 and 58 is facilitated by the on-axis geometry.

Figure 7:
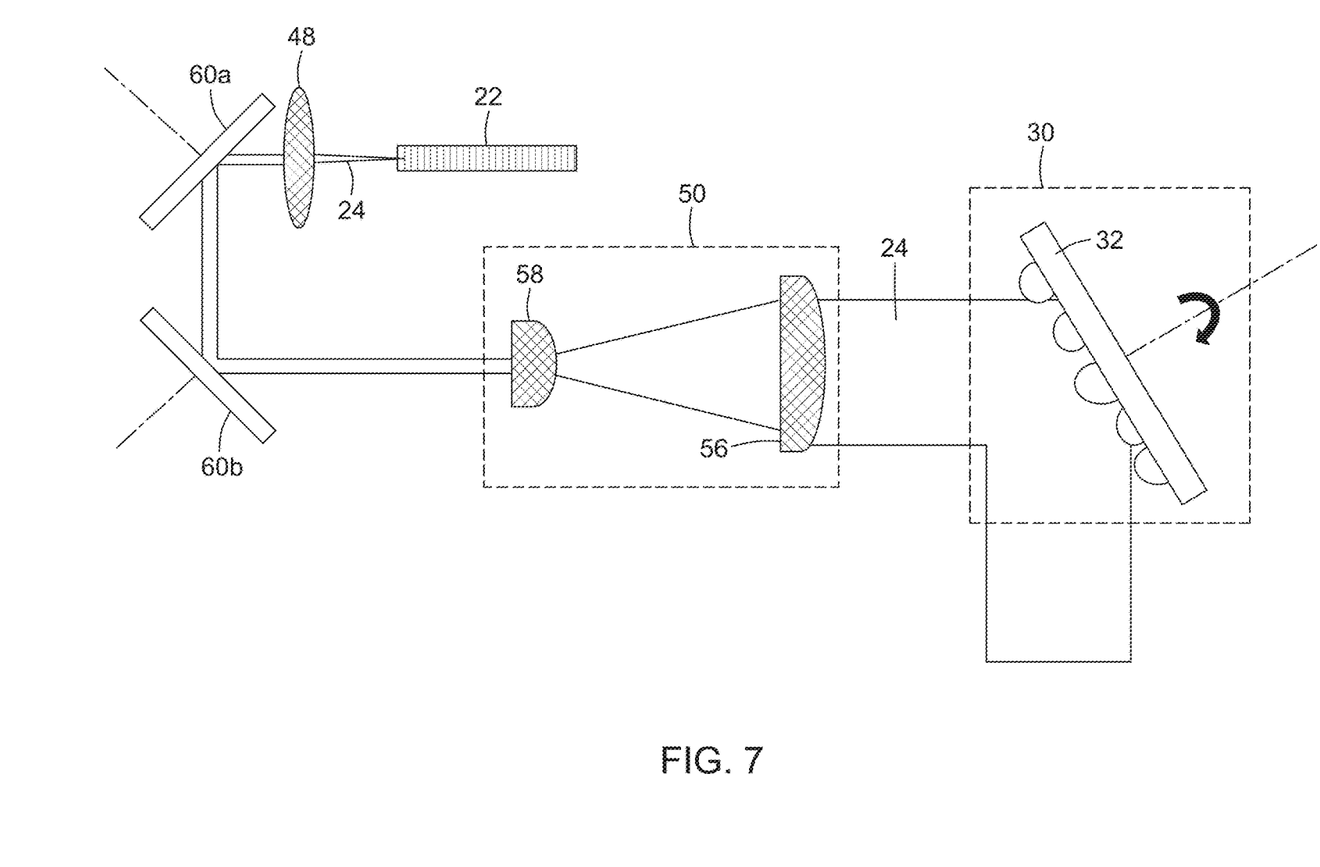

FIG. 7 shows yet another variant illustrating that in some implementations, the coherence-breaking module 30 may be disposed along the optical path of the light beam 24 and downstream the beam transforming module 50. In this illustration the coherence-breaking module 30 is shown as including a single coherence-breaking mirror 32, although two mirrors may be used in the same configuration. This arrangement is shown herein as paired with the use of lenses as the primary and secondary optical elements 56 and 58 of the beam transforming module 50, although mirrors may be used in other variants. Also emphasized in this embodiment is the use of additional optical components within the beam conditioning device, such as for example additional mirrors 60a and 60b. It will be noted that in this example the additional mirrors 60a and 60b do not act as coherence-breaking mirrors, but simply redirect the light beam 24. Such additional mirrors may of course be omitted or positioned differently without departing from the scope of the invention.

Figure 8A:
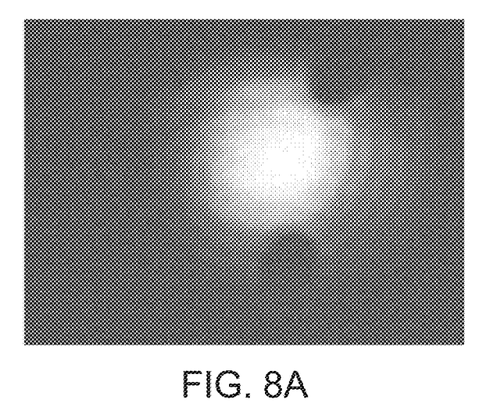
FIGS. 8A to 8C are images showing a light beam respectively prior to a beam conditioning device according to one variant, after passage through the coherence-breaking module and after passage through the beam transforming module.
Figure 8B:
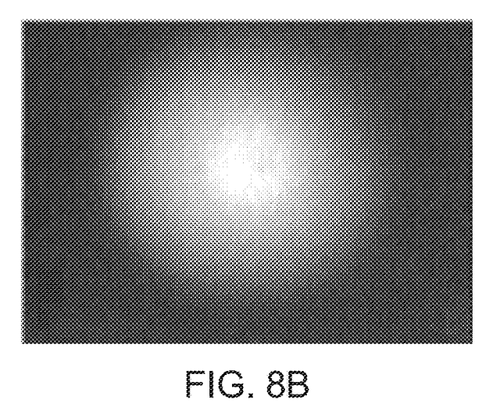
Figure 8C:
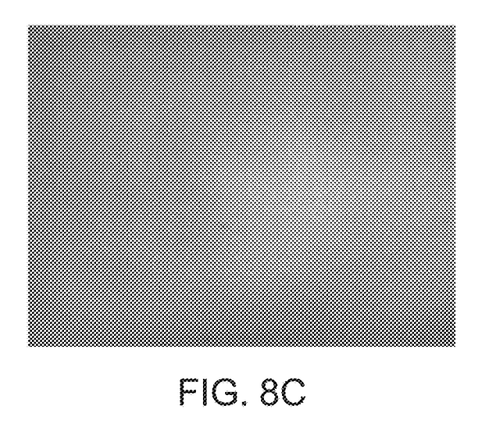

It has been found that beam conditioning devices according to embodiments of the invention can provide improved uniformization or shaping of the resulting light beam, and improved image quality in imaging applications. By way of example, FIGS. 8 A to 8C illustrate the effect of a beam conditioning device such as the one of FIG. 1 on an input Gaussian light beam. FIG. 8A shows the profile of the light beam prior to entering the beam conditioning device. Spots created by interference between the coherent beam components can clearly be seen. FIG. 8B illustrates the removal of these effects after propagation through the coherence-breaking module. FIG. 8C shows the final light beam, after passage through both the coherence-breaking module and the beam transforming module, and illustrates the uniformity and clarity of the resulting beam.

Of course, numerous modifications could be made to the embodiments above without departing from the scope of the invention.

The invention claimed is:

1. A beam conditioning device for conditioning a light beam having a shape in a transverse plane perpendicular to a propagation axis of said light beam defining a non-uniform initial spatial energy distribution, the beam conditioning device comprising:
   a coherence-breaking module for breaking a spatial coherence between beam components of the light beam, the coherence-breaking module comprising a first and a second coherence-breaking mirror successively disposed in an optical path of the light beam and each having a reflective surface extending along a reflection plane intersecting the propagation axis of the light beam, the reflecting surface of each coherence-breaking mirror comprising a structured pattern, the structured pattern including a plurality of sloped elements distributed over the reflection plane, each sloped element being configured to deviate any of the beam components of the light beam incident thereon by a small angle; and
   a beam transforming module comprising a primary and a secondary optical element successively disposed in an optical path of the light beam, the primary and secondary optical elements being disposed relative to each other such that the propagation axis of the light beam downstream the secondary optical element is parallel to the propagation axis thereof upstream the primary optical element, the secondary optical element being positioned off-axis with respect to at least one axis transverse to the propagation axis of the light beam, each of the primary and secondary optical elements having a surface topography respectively redirecting beam components of the light beam along first and second redirected trajectories, the surface topographies of the primary and secondary optical elements being configured such that the second redirected trajectories collectively define a final spatial energy distribution having a uniform portion.

2. The beam conditioning device according to claim 1, wherein each coherence-breaking mirror is rotatable about a rotation axis perpendicular to the corresponding reflection plane.

3. The beam conditioning device according to claim 1, wherein the primary optical element is a convex mirror and the secondary optical element is a concave mirror.

4. The beam conditioning device according to claim 1, wherein the secondary optical element is positioned off-axis with respect to two orthogonal axes transverse to the propagation axis of the light beam.

5. The beam conditioning device according to claim 1, wherein the surface topographies of the primary and secondary optical elements correspond to numerically obtained solutions to a set of equations representing the first and second redirected trajectories as functions of said surface topographies and of derivatives of said surface topographies in view of the initial spatial energy distribution and the final spatial energy distribution.

6. The beam conditioning device according to claim 1, where the initial spatial energy distribution has a Gaussian shape and the final spatial energy distribution has a flat top shape defined by said uniform portion flanked by gradually decreasing side walls.

7. The beam conditioning device according claim 6, wherein the shape of the light beam defines an initial footprint, and the beam transforming module is further configured to transform the shape of the light beam into a final footprint different from the initial footprint.

8. A coherence-breaking module for breaking a spatial coherence between beam components of a light beam having an optical frequency in the terahertz frequency range or lower, the coherence-breaking module comprising a first and a second coherence-breaking mirror successively disposed in an optical path of the light beam and each having a reflective surface extending along a reflection plane intersecting a propagation axis of the light beam, the reflecting surface of each coherence-breaking mirror comprising a structured pattern, the structured pattern including a plurality of sloped elements distributed over the reflection plane, each sloped element being configured to deviate any of the beam components of the light beam incident thereon by a small angle.

9. A beam transforming module for use in imaging applications involving a light beam having a shape in a transverse plane perpendicular to a propagation axis of said light beam defining a non-uniform initial spatial energy distribution and an initial footprint, the beam transforming module comprising:
   a primary optical element disposed in an optical path of the light beam and having a surface topography redirecting beam components of the light beam along corresponding first redirected trajectories; and
   a secondary optical element disposed downstream the primary optical element and positioned off-axis with respect to two orthogonal axes transverse to the propagation axis of the light beam, the secondary optical element having a surface topography redirecting the beam components of the light beam along corresponding second redirected trajectories,
wherein the surface topographies of the primary and secondary optical elements are configured such that the second redirected trajectories collectively define a final spatial energy distribution having a uniform portion and a final footprint different from the initial footprint.

10. A beam transforming module for use in imaging applications involving a light beam having an optical frequency in the terahertz frequency range or lower, the light beam further having a shape in a transverse plane perpendicular to a propagation axis of said light beam defining a non-uniform initial spatial energy distribution, the beam transforming module comprising:
   a primary optical element disposed in an optical path of the light beam, the primary optical element having a surface topography redirecting beam components of the light beam along corresponding first redirected trajectories; and
   a secondary optical element disposed downstream the primary optical element, the secondary optical element having a surface topography redirecting the beam components of the light beam along corresponding second redirected trajectories,
wherein the surface topographies of the primary and secondary optical elements correspond to numerically obtained solutions to a set of equations representing the first and second redirected trajectories as functions of said surface topographies and of derivatives of said surface topographies in view of the initial spatial energy distribution and further in view of a final spatial energy distribution having a flat top shape defined by a uniform portion flanked by gradually decreasing side walls.

11. A light generating assembly for use in imaging applications, comprising:
   a coherent light source operable to generate a light beam having an optical frequency in the terahertz frequency range or lower, the light beam further having a shape in a transverse plane perpendicular to a propagation axis of said light beam defining a non-uniform initial spatial energy distribution and an initial footprint;
   a coherence-breaking module disposed in an optical path of the light beam and configured to break a spatial coherence between beam components of the light beam; and
   a beam transforming module disposed in the optical path of the light beam and configured to transform the shape of the light beam into a final spatial energy distribution having a uniform portion and a final footprint different from the initial footprint.

12. The light generating assembly according to claim 11, wherein the coherence-breaking module comprising first and second coherence-breaking mirrors each having a reflective surface extending along a reflection plane intersecting the propagation axis of the light beam.

13. The light generating assembly according to claim 12, wherein the reflecting surface of each coherence-breaking mirror comprising a structured pattern, the structured pattern including a plurality of sloped elements distributed over the reflection plane.

14. The light generating assembly according to claim 13, wherein each sloped element is configured to deviate any of the beam components of the light beam incident thereon by a small angle and is oriented to deviate the beam component of the light beam incident thereon at a deviation angle slightly different than a deviation angle imparted on neighboring beam components by neighboring sloped elements.

15. The light generating assembly according to claim 12, wherein each coherence-breaking mirror is rotatable about a rotation axis perpendicular to the corresponding reflection plane.

16. The light generating assembly according to claim 11, wherein the beam transforming module comprising a primary and a secondary optical element successively disposed in the optical path of the light beam.

17. The light generating assembly according to claim 16, wherein the primary optical element has a surface topography redirecting the beam components of the light beam along corresponding first redirected trajectories and the secondary optical element has a surface topography redirecting the beam components of the light beam along corresponding second redirected trajectories, the surface topographies of the primary and secondary optical elements being configured such that the second redirected trajectories collectively define the final spatial energy distribution of the light beam when said light beam impinges on the primary optical element in the initial spatial energy distribution.

18. The light generating assembly according to claim 16, wherein the primary optical element is positioned off-axis with respect to at least one axis transverse to the propagation axis of the light beam and the primary and secondary optical elements are disposed relative to each other such that the propagation axis of the light beam downstream the secondary optical elements is parallel to the propagation axis thereof upstream the primary optical element.

19. The light generating assembly according to claim 16, wherein the surface topographies of the primary and secondary optical elements correspond to solutions to a set of equations representing the first and second redirected trajectories as functions of said surface topographies and of derivatives of said surface topographies in view of the initial spatial energy distribution and the final spatial energy distribution.

20. The light generating assembly according to claim 19, wherein said solutions are numerically obtained.

* * * * *